United States Patent [19]
Hirose et al.

[11] Patent Number: 6,024,873
[45] Date of Patent: *Feb. 15, 2000

[54] HIGHLY PERMEABLE COMPOSITE REVERSE OSMOSIS MEMBRANE AND A REVERSE OSMOSIS MEMBRANE MODULE USING THE SAME

[75] Inventors: Masahiko Hirose; Hiroki Ito; Tomomi Ohara, all of Shiga, Japan

[73] Assignee: Nitto Denko Corporation, Osaka, Japan

[ * ] Notice: This patent is subject to a terminal disclaimer.

[21] Appl. No.: 08/819,326

[22] Filed: Mar. 18, 1997

[30] Foreign Application Priority Data

Mar. 21, 1996 [JP] Japan .................................. 8-065024

[51] Int. Cl.⁷ .................................................. B01D 29/00
[52] U.S. Cl. ............................... 210/500.38; 210/500.37; 210/500.42; 210/490; 210/321.6
[58] Field of Search ........................ 210/500.37, 500.38, 210/500.39, 500.42, 490, 321.6

[56] References Cited

U.S. PATENT DOCUMENTS

| | | | |
|---|---|---|---|
| 4,262,041 | 4/1981 | Eguchi et al. | 427/245 |
| 4,277,344 | 7/1981 | Cadotte | 210/654 |
| 4,337,154 | 6/1982 | Fukuchi et al. | 210/490 |
| 4,360,434 | 11/1982 | Kawaguchi et al. | 210/500.2 |
| 4,520,044 | 5/1985 | Sundet | 427/244 |
| 4,604,208 | 8/1986 | Chu et al. | 210/636 |
| 4,707,265 | 11/1987 | Barnes, Jr. et al. | 210/638 |
| 4,758,343 | 7/1988 | Sasaki et al. | 210/500.28 |
| 4,765,897 | 8/1988 | Cadotte et al. | 264/48 |
| 4,772,394 | 9/1988 | Swedo et al. | 210/500.38 |
| 4,792,404 | 12/1988 | Swedo et al. | 210/654 |
| 4,812,270 | 3/1989 | Cadotte et al. | 264/48 |
| 4,830,885 | 5/1989 | Tran et al. | 427/245 |
| 4,872,984 | 10/1989 | Tomaschke | 210/500.38 |
| 4,888,115 | 12/1989 | Marinaccio et al. | 210/636 |
| 4,950,404 | 8/1990 | Chau | 210/500 |
| 4,960,518 | 10/1990 | Cadotte et al. | 210/639 |
| 5,015,382 | 5/1991 | Sundet | 210/490 |
| 5,051,178 | 9/1991 | Uemura et al. | 210/500.38 |
| 5,069,945 | 12/1991 | Wrasidlo | 427/245 |
| 5,152,901 | 10/1992 | Hodgdon | 210/654 |
| 5,234,598 | 8/1993 | Tran et al. | 210/654 |
| 5,271,843 | 12/1993 | Chau et al. | 210/654 |
| 5,576,057 | 11/1996 | Hirose et al. | 427/245 |
| 5,614,099 | 3/1997 | Hirose et al. | 210/653 |

FOREIGN PATENT DOCUMENTS

| | | |
|---|---|---|
| 0 015 149 | 9/1980 | European Pat. Off. . |
| 0 498 596 | 8/1992 | European Pat. Off. . |
| 0 718 029 | 6/1996 | European Pat. Off. . |
| 0 718 030 | 6/1996 | European Pat. Off. . |
| 61-263602 | 11/1986 | Japan . |
| 62-121603 | 6/1987 | Japan . |
| 62-266103 | 11/1987 | Japan . |
| 63-012310 | 1/1988 | Japan . |
| 63-054905 | 3/1988 | Japan . |
| 63-130105 | 6/1988 | Japan . |
| 63-218208 | 9/1988 | Japan . |
| 1-180208 | 7/1989 | Japan . |
| 4-341334 | 11/1992 | Japan . |
| 5-096141 | 4/1993 | Japan . |
| 5-309237 | 11/1993 | Japan . |
| 7-008770 | 1/1995 | Japan . |
| 8402648 | 3/1986 | Netherlands . |

*Primary Examiner*—Ana Fortuna
*Attorney, Agent, or Firm*—Akin, Gump, Strauss, Hauer & Feld, L.L.P.

[57] ABSTRACT

The present invention provides a composite reverse osmosis membrane and a reverse osmosis membrane module using the same, having a high salt rejection, high water permeability, and a high rejection of organic substances such as isopropyl alcohol, which can be used to remove organic substances as well as ionic substances with suitable efficiency and economy. The highly permeable composite reverse osmosis membrane of the invention can be produced by adding alcohols or ethers or the like having a solubility parameter of $8–14$ $(cal/cm^3)^{1/2}$ to the solution containing at least one compound selected from the group consisting of a compound having two or more reactive amino groups and a polyfunctional acid halide having two or more reactive acid halide groups which is used when conducting the polycondensation of a compound having two or more reactive amino groups and a polyfunctional acid halide having two or more reactive acid halide groups on a microporous support.

12 Claims, No Drawings

HIGHLY PERMEABLE COMPOSITE REVERSE OSMOSIS MEMBRANE AND A REVERSE OSMOSIS MEMBRANE MODULE USING THE SAME

FIELD OF THE INVENTION

The present invention relates to a reverse osmosis membrane and a reverse osmosis membrane module using the same, and more particularly to a highly permeable composite reverse osmosis membrane and a reverse osmosis membrane module using the same which can perform reverse osmosis treatment at low pressure and can remove organic substances efficiently.

BACKGROUND OF THE INVENTION

A composite reverse osmosis membrane is preferably used for many purposes such as production of ultrapure water and desalination of sea water or brackish water. This membrane also can be used to remove and withdraw contaminants which are the cause of pollution, for example, waste materials from dyeing baths or electrochemical deposition coating systems. The contaminated water can be cleaned for reuse. Furthermore, it is possible to condense effective components for food and to remove harmful matters for purified water and sewage.

Conventionally, a composite reverse osmosis membrane, which is obtained by forming a skin layer substantially having selective separating properties on a microporous support, has been known as a reverse osmosis membrane whose structure is different from that of an asymmetric reverse osmosis membrane.

There have been composite reverse osmosis membranes in which a skin layer comprising polyamide obtained by interfacial polycondensation of polyfunctional aromatic amine and polyfunctional aromatic acid halide is formed on a support (for example, Japanese Laid-Open Patent Publication Nos. 55-147106, 62-121603 and 63-218208, Japanese Patent Publication No. 6-73617, and the like).

The composite reverse osmosis membranes described above have a high desalination performance and a high flux performance. However, it has been desired that the composite reverse osmosis membranes should further improve the flux performance while keeping a high desalination performance with respect to a reduction in operation and equipment costs, efficiency and the like. For these requirements, various additives have been proposed (for example, Japanese Laid-Open Patent Publication No. 63-12310), which have improved performance but are insufficient. Furthermore, after-treatment of the composite reverse osmosis membrane performed by using chlorine and the like also has been proposed (for example, Japanese Laid-Open Patent Publication Nos. 63-54905 and 1-180208).

However, all of the prior arts described above improve the flux performance of the membranes by utilizing certain types of deteriorating reactions for the polymers. Therefore, while ionic substances such as sodium chloride can be removed by charged membranes, inorganic or organic substances having low or no charge may permeate the membranes through defects at the molecular level where polymer chains are cut due to the deteriorating reaction, thereby reducing the rejection of these substances. For example, the rejection of isopropyl alcohol, which is used as a measure of rejection, is greatly reduced due to the deteriorating reaction caused by after-treatment as described above, so that it cannot be used in producing ultra pure water. Furthermore, with regard to organic harmful matters in drinking water recently at issue, the rejection is also reduced in the same way as described above, so that the required water quality cannot be obtained.

SUMMARY OF THE INVENTION

In order to solve the above-mentioned problems, it is an object of the present invention to provide a composite reverse osmosis membrane and a reverse osmosis membrane module using the same having a high salt rejection and a high flux performance. In particular, it is an object of the present invention to provide a composite reverse osmosis membrane and a reverse osmosis membrane module using the same having high rejection performance for organic substances such as isopropyl alcohol, as well as ionic substances such as sodium chloride, which therefore can be used to remove organic substances as well as ionic substances with the desired efficiency and economy.

In order to achieve the above-mentioned object, the highly permeable composite reverse osmosis membrane of the present invention comprises a thin film and a microporous support for supporting the thin film, wherein the thin film is a polyamide based skin layer obtained by polycondensation of a compound having two or more reactive amino groups and a polyfunctional acid halide having two or more reactive acid halide groups. Furthermore, a highly permeable composite reverse osmosis membrane of the present invention provides a salt rejection of 90% or more and a flux of 0.8 $m^3/m^2$·day or more, preferably a flux of 1.0 $m^3/m^2$·day or more, when evaluated by using an aqueous solution having pH 6.5 containing 500 ppm of sodium chloride at an operating pressure of 5 $kgf/cm^2$ and a temperature of 25° C., and also provides an isopropyl alcohol rejection of 60% or more, preferably 65% or more, when evaluated by using an aqueous solution having pH 6.5 containing 500 ppm of isopropyl alcohol at an operating pressure of 5 $kgf/cm^2$ and a temperature of 25° C.

It is preferable that the polyamide based skin layer in the composite reverse osmosis membrane is of aromatic polyamide. If the skin layer is, for example, of aliphatic polyamide, the performance of the membrane is lowered after chemical washing of slime (contamination of ooze formed mainly from microorganism) produced after long-term use or of scale, because the aliphatic polyamide has lower chemical resistance as compared to the aromatic polyamide. More preferably, the polyamide based skin layer is essentially totally aromatic polyamide which is obtained by polycondensation of an aromatic compound having two or more reactive amino groups and a polyfunctional aromatic acid halide having two or more reactive acid halide groups.

The highly permeable composite reverse osmosis membrane of the invention can be produced by adding alcohols or ethers or the like having a solubility parameter of 8–14 $(cal/cm^3)^{1/2}$ to the solution containing at least one compound selected from the group consisting of a compound having two or more reactive amino groups and a polyfunctional acid halide having two or more reactive acid halide groups which is used when conducting the polycondensation of a compound having two or more reactive amino groups and a polyfunctional acid halide having two or more reactive acid halide groups on a microporous support.

It is preferable that the composite reverse osmosis membrane of this invention is used as a reverse osmosis membrane in a membrane module. Also, it is preferable that the module is at least one selected from the group consisting of a spiral wound type membrane module, an immersed flat sheet type membrane module, a rotary flat sheet type membrane module, and a plate-and-frame membrane module. The immersed flat sheet type membrane module is disclosed in, for example, Japanese Laid-Open Patent Publication No. 61-129094.

According to the present invention, a composite reverse osmosis membrane having a high salt rejection, high water permeability, and a high rejection of organic substances such as isopropyl alcohol, which can be used to remove organic substances as well as ions with suitable efficiency and economy, can be obtained.

DETAILED DESCRIPTION OF THE INVENTION

The method of producing a highly permeable composite reverse membrane of the present invention is not limited as long as the above-mentioned properties of the composite reverse osmosis membrane can be obtained.

The highly permeable composite reverse osmosis membrane of this invention can be produced, for example, by adding at least one compound having a solubility parameter of 8 to 14 $(cal/cm^3)^{1/2}$ selected from the group consisting of alcohols, ethers, ketones, esters, halogenated hydrocarbons, and sulfur-containing compounds to a system in which a compound having two or more reactive amino groups and a polyfunctional acid halide having two or more reactive acid halide groups perform interfacial polycondensation. Namely, a compound having the above-described solubility parameter is added to at least one of the solutions before the interfacial polycondensation is conducted.

The alcohols include, for example, ethanol, propanol, butanol, 1-pentanol, 2-pentanol, t-amyl alcohol, isoamyl alcohol, isobutyl alcohol, isopropyl alcohol, undecanol, 2-ethyl butanol, 2-ethyl hexanol, octanol, cyclohexanol, tetrahydrofurfuryl alcohol, neopentyl glycol, t-butanol, benzyl alcohol, 4-methyl-2-pentanol, 3-methyl-2-butanol, allyl alcohol, ethylene glycol, diethylene glycol, triethylene glycol, and tetraethylene glycol.

The ethers include, for example, anisole, ethyl isoamyl ether, ethyl-t-butyl ether, ethylbenzyl ether, crown ether, cresyl methyl ether, diisoamyl ether, diisopropyl ether, diethyl ether, dioxane, diglycidyl ether, cineol, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl-t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrin.

The ketones include, for example, ethyl butyl ketone, diacetone alcohol, diisobutyl ketone, cyclohexanone, 2-heptanone, methyl isobutyl ketone, methyl ethyl ketone, and methyl cyclohexane.

The esters include, for example, methyl formate, ethyl formate, propyl formate, butyl formate, isobutyl formate, isoamyl formate, methyl acetate, ethyl acetate, propyl acetate, isobutyl acetate, butyl acetate, and amyl acetate.

The halogenated hydrocarbons include, for example, allyl chloride, amyl chloride, dichloromethane, and dichloroethane.

The sulfur-containing compounds include, for example, dimethyl sulfoxide, sulfolane, and thiolane. Among these compounds, alcohols and ethers are especially preferable. These compounds can be used either alone or as mixtures thereof.

The compound having two or more reactive amino groups used in the present invention is not limited as long as it is a polyfunctional amine having two or more reactive amino groups, for example, aromatic, aliphatic, and alicyclic polyfunctional amines.

The examples of the aromatic polyfunctional amines are, m-phenylenediamine, p-phenylenediamine, 1,3,5-triaminobenzene, 1,2,4-triaminobenzene, 3,5-diaminobenzoic acid, 2,4-diaminotoluene, 2,4-diaminoanisole, amidol, and xylylenediamine.

The examples of the aliphatic polyfunctional amines are ethylenediamine, propylenediamine, and tris(2-diaminoethyl)amine.

The examples of the alicyclic polyfunctional amines are, 1,3-diaminocyclohexane, 1,2-diaminocyclohexane, 1,4-diaminocyclohexane, piperazine, 2,5-dimethylpiperazine, and 4-aminomethylpiperazine. Those amines can be used alone or as mixtures thereof. It is preferable to use aromatic amines.

The polyfunctional acid halide having two or more reactive acid halide groups used in the present invention is not particularly restricted, and the examples include aromatic, aliphatic, and alicyclic polyfunctional acid halides.

The examples of the aromatic polyfunctional acid halides which can be used in the present invention are trimesic acid chloride, terephthalic acid chloride, isophthalic acid chloride, biphenyldicarboxylic acid dichloride, benzene trisulfonic acid chloride, benzene disulfonic acid chloride, chlorosulfonyl benzene dicarboxylic acid chloride, and naphthalene dicarboxylic acid dichloride.

The examples of the aliphatic polyfunctional acid halides are propanetricarboxylic acid chloride, butanetricarboxylic acid chloride, pentanetricarboxylic acid chloride, glutaryl halide, and adipoyl halide.

The examples of the alicyclic polyfunctional acid halides are cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclobutanedicarboxylic acid chloride, cyclopentanedicarboxylic acid chloride, cyclohexanedicarboxylic acid chloride, and tetrahydrofurandicarboxylic acid chloride. These acid halides can be used either alone or as mixtures thereof. It is preferable to use aromatic polyfunctional acid halides.

According to the present invention, a composite reverse osmosis membrane, in which a skin layer containing a crosslinked polyamide as a main component is formed on a microporous support, is obtained by interfacial polycondensation of the compound having two or more reactive amino groups and the polyfunctional acid halide having two or more reactive acid halide groups.

In the present invention, the microporous support for supporting the skin layer is not particularly limited as long as it can support the skin layer, and the examples are polysulfone, polyaryl ether sulfones such as polyether sulfone, polyimide and polyvinylidene fluoride. A microporous support comprising polysulfone or polyaryl ether sulfone is especially preferable because it is stable chemically, mechanically and thermally. Such a microporous support usually has a thickness of about 25 to 125 $\mu$m, and preferably, about 40 to 75 $\mu$m, but the thickness is not necessarily limited to those ranges.

In more detail, the composite reverse osmosis membrane can be obtained by forming a first layer comprising an aqueous solution containing the compound having two or more reactive amino groups on the microporous support, forming a layer comprising the solution containing the acid halide component on the first layer, and then performing the interfacial polycondensation to form a skin layer comprising crosslinked polyamide on the microporous support.

The aqueous solution containing a compound having two or more reactive amino groups can further contain a water soluble polymer such as polyvinyl alcohol, polyvinyl pyrrolidone, polyacrylic acid, and/or a polyhydric alcohol such as sorbitol or glycerol in order to facilitate the film formation and improve the performance of the produced composite reverse osmosis membranes.

The amine salts described in Japanese Laid-Open Patent Publication No. 2-187135, such as a salt of a tetraalkylammonium halide or a trialkylamine and an organic acid can also be suitably used for the solution to facilitate the film formation, improve the absorption of the amine solution in the support, and promote the condensation reaction.

The solution can further contain a surfactant such as sodium dodecylbenzenesulfonate, sodium dodecylsulfonate, and sodium laurylsulfonate. Such a surfactant has an effect for improving the wettability of the aqueous solution containing the polyfunctional amine for the microporous support. Furthermore, it is effective to use sodium hydroxide or sodium tertiary phosphate capable of removing a hydrogen halide formed by the interfacial reaction or to use an acylation catalyst as a catalyst in order to promote the polycondensation reaction at the interface.

The concentration of the acid halide and that of the polyfunctional amine are not particularly limited for the solution containing the acid halide and the aqueous solution containing the compound having two or more reactive amino groups, but the concentration of the acid halide is usually 0.01 to 5 wt %, and preferably 0.05 to 1 wt %. The concentration of the polyfunctional amine is usually 0.01 to 10 wt %, and preferably, 0.5 to 5 wt %.

Thus, the solution containing the compound having two or more reactive amino groups is coated on the microporous support, and the solution containing the acid halide is coated thereon. After the extra solutions are removed, the coated layers are heated and dried at a temperature of about 20 to 150° C., preferably about 70 to 130° C., for about 1 to 10 minutes, preferably about 2 to 8 minutes. Thus, the skin layer having water permeability formed of crosslinked polyamide is obtained. The skin layer usually has a thickness of about 0.05 to 2 $\mu$m, and preferably, about 0.1 to 1 $\mu$m.

A preferred example of the present invention will be described below in more detail. The present invention is not restricted to the following example. A polysulfone based ultrafiltration membrane was used as a microporous support in the example.

EXAMPLE 1

An aqueous solution containing 3.0 wt % of m-phenylenediamine, 0.15 wt % of sodium laurylsulfate, 3.0 wt % of triethylamine, 6.0 wt % of camphor sulfonic acid, and 9 wt % of isopropyl alcohol was caused to come in contact with a porous polysulfone supporting film for several seconds. Thus, any extra aqueous solution was removed to form a layer of the aqueous solution on the supporting film.

Then, an IP1016 solution (isoparaffin based hydrocarbon oil made by IDEMITSU Chemical Co. Ltd.) containing 0.15 wt % of trimesic acid chloride and 0.06 wt % of isopropyl alcohol was caused to come in contact with the surface of the supporting film, and was thereafter held for 3 mins. in a hot air dryer at a temperature of 120° C. Consequently, a polymeric thin film was formed on the supporting film. Thus, a composite reverse osmosis membrane was obtained. The produced composite reverse osmosis membrane was evaluated by using a saline solution having pH 6.5 containing 500 ppm of sodium chloride at a pressure of 5 kgf/cm$^2$. Consequently, a salt rejection of 95% and a flux of 1.1 m$^3$/m$^2$·day were obtained, the former being evaluated based on the conductivity of the permeable solution. Furthermore, the composite reverse osmosis membrane was evaluated by using a solution having pH 6.5 containing 500 pm of isopropyl alcohol at a pressure of 5 kgf/cm$^2$. Consequently, an isopropyl alcohol rejection of 65% was obtained as evaluated by gas chromatography analysis

COMPARATIVE EXAMPLE 1

A composite reverse osmosis membrane was obtained in the same manner as in Example 1 except that isopropyl alcohol was not added to the amine solution or the acid chloride organic solution. The performance of the composite reverse osmosis membrane was evaluated by using a saline solution having pH 6.5 containing 500 ppm of sodium chloride at a pressure of 5 kgf/cm$^2$. Consequently, a salt rejection of 99% and a flux of 0.4 m$^3$/m$^2$·day were obtained, the flux of the composite reverse osmosis membrane being too low for practical use. Furthermore, the composite osmosis membrane was evaluated by using a solution having pH 6.5 containing 500 ppm of isopropyl alcohol at a pressure of 5 kgf/cm$^2$. Consequently, an isopropyl alcohol rejection of 90% was obtained. Next, the composite reverse osmosis membrane was immersed in an aqueous solution of sodium hypochlorite, where the concentration of free chlorine was adjusted to 100 ppm, at a room temperature for 100 hours. After water-washing of the membrane, it was evaluated by using a saline solution having pH 6.5 containing 500 ppm of sodium chloride at a pressure of 5 kgf/cm$^2$. Consequently, a salt rejection of 93% and a flux of 0.9 m$^3$/m$^2$·day were obtained. Furthermore, the membrane was evaluated by using a solution having pH 6.5 containing 500 ppm of isopropyl alcohol at a pressure of 5 kgf/cm$^2$. Consequently, an isopropyl alcohol rejection of 50% was obtained, which is too low for practical use.

Accordingly, such an after-treatment method by using chlorine or the like as described above can increase flux and also provide a rejection of sodium chloride which is sufficient in the present invention, however, the isopropyl alcohol rejection of the membrane is greatly reduced by the after-treatment. Therefore, this method is not suitable for practical use.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A highly permeable composite reverse osmosis membrane comprising:

a thin film:

a microporous support for supporting the thin film, wherein the thin film is a polyamide based skin layer obtained by polycondensation of a compound having two or more reactive amino groups and a polyfunctional acid halide having two or more reactive acid halide groups, the highly permeable composite reverse osmosis membrane having a salt rejection of 90% or more and a flux of 0.8 m$^3$/m$^2$·day or more when evaluated by using a solution having pH 6.5 containing 500 ppm of sodium chloride at an operating pressure of 5 kgf/cm$^2$ and a temperature of 25° C., and having an isopropyl alcohol rejection of 60% or more when evaluated by using a solution having pH 6.5 containing 500 ppm of isopropyl alcohol at an operating pressure of 5 kgf/cm$^2$ and a temperature of 25° C.

2. The highly permeable composite reverse osmosis membrane as defined in claim 1, wherein the polyamide based skin layer is an aromatic polyamide.

3. The highly permeable composite reverse osmosis membrane as defined in claim 1, wherein the polyamide based skin layer is a totally aromatic polyamide.

4. The highly permeable composite reverse osmosis membrane as defined in claim 1, wherein a flux of 1.0 m$^3$/m$^2$·day or more is obtained when evaluated by using a solution having pH 6.5 containing 500 ppm of sodium chloride at an operating pressure of 5 kgf/cm$^2$ and a temperature of 25° C.

5. The highly permeable composite reverse osmosis membrane as defined in claim 1, wherein an isopropyl alcohol rejection of 65% or more is obtained when evaluated by using a solution having pH 6.5 containing 500 ppm of isopropyl alcohol at an operating pressure of 5 kgf/cm$^2$ and a temperature of 25° C.

6. The highly permeable composite reverse osmosis membrane as defined in claim 1, wherein when a polycondensation of a compound having two or more reactive amide groups and a polyfunctional acid halide having two or more reactive acid halide groups is perfomed to form the polyamide based skin layer on the microporous support, a compound having a solubility parameter of 8 to 14 (cal/cm$^3$)$^{1/2}$ is present in a reaction solution containing at least one compound selected from the compound having amino groups and the polyfunctional halide.

7. The highly permeable composite reverse osmosis membrane as defined in claim 6, wherein the compound having a solubility parameter of 8 to 14 (cal/cm$^3$)$^{1/2}$ is at least one selected from the group consisting of alcohol and ether.

8. The highly permeable composite reverse osmosis membrane as defined in claim 7, wherein the compound is an alcohol selected from the group consisting of ethanol, propanol, butanol, 1-pentanol, 2-pentanol, t-amyl alcohol, isoamyl alcohol, isobutyl alcohol, isopropyl alcohol, undecanol, 2-ethyl butanol, 2-ethyl hexanol, octanol, cyclohexanol, tetrahydro furfuryl alcohol, neopentyl glycol, t-butanol, benzyl alcohol, 4-methyl-2-pentanol, 3-methyl-2-butanol, allyl alcohol, ethylene glycol, diethylene glycol, triethylene glycol, and tetraethylene glycol.

9. The highly permeable composite reverse membrane as defined in claim 7, wherein the compound is an ether selected from the group consisting of anisole, ethyl isoamyl ether, ethyl-t-butyl ether, ethylbenzyl ether, crown ether, cresyl metyl ether, diisoamyl ether, diisopropyl ether, diethyl ether, dioxane, diglycidyl ether, cineol, diphenyl ether, dibutyl ether, dipropyl ether, dibenzyl ether, dimethyl ether, tetrahydropyran, tetrahydrofuran, trioxane, dichloroethyl ether, butyl phenyl ether, furan, methyl-t-butyl ether, monodichlorodiethyl ether, ethylene glycol dimethyl ether, ethylene glycol diethyl ether, ethylene glycol dibutyl ether, ethylene glycol monomethyl ether, ethylene glycol monoethyl ether, ethylene glycol monobutyl ether, diethylene glycol dimethyl ether, diethylene glycol diethyl ether, diethylene glycol dibutyl ether, diethylene glycol monomethyl ether, diethylene glycol monoethyl ether, diethylene glycol monobutyl ether, and diethylene chlorohydrin.

10. The highly permeable composite reverse osmosis membrane as defined in claim 6, wherein 10 ppm to 50 weight % of a compound having a solubility parameter of 8 to 14 (cal/cm$^3$)$^{1/2}$ is added to the reaction solution.

11. A reverse osmosis membrane module comprising the highly permeable composite reverse osmosis membrane according to claim 1.

12. The highly permeable composite reverse osmosis membrane module as defined in claim 11, wherein the module is at least one selected from the group consisting of a spiral wound type membrane module, an immersed flat sheet type membrane module, a rotary flat sheet type membrane module, and a plate-and-frame membrane module.

* * * * *